United States Patent

Araujo

[15] 3,648,958
[45] Mar. 14, 1972

[54] BASKET FOR BABY BOTTLE

[72] Inventor: Nat E. Araujo, 1216 E. Dagget, Fort Worth, Tex. 76104

[22] Filed: Aug. 5, 1970

[21] Appl. No.: 61,321

[52] U.S. Cl. ................248/105, 248/312, 248/350, 248/359
[51] Int. Cl. ..........................................A47d 15/00
[58] Field of Search ..............248/102, 105, 104, 359, 361 A, 248/350, 312; 215/11 C, 100 R

[56] References Cited

UNITED STATES PATENTS

| 611,857 | 10/1898 | Buck | 248/105 |
| 1,729,531 | 9/1929 | Wolever | 248/105 |
| 1,886,619 | 11/1932 | Arnone | 248/105 |
| 2,328,367 | 8/1943 | Todd | 245/100 X |
| 2,474,416 | 6/1949 | Du Bois | 248/105 |
| 3,029,058 | 4/1962 | Himler | 248/350 |

Primary Examiner—Chancellor E. Harris

[57] ABSTRACT

This invention consists of a single piece of rubber or any other desired material configurated in the shape of a basket that is adapted to hold a baby bottle. The aforesaid basket has a horizontally disposed flat rectangular bottom and upwardly extending sides and a front end having a round opening therein through which is placed the neck of a baby bottle that is placed in the aforesaid basket in a horizontally disposed position. The rear end of the aforesaid basket is so constructed as to prevent the baby bottle from slipping backward out of the basket. A holding strap that is U-shaped when viewed from the top is adapted to hold the top side of the bottle in place in this novel basket.

3 Claims, 4 Drawing Figures

PATENTED MAR 14 1972 3,648,958

*INVENTOR*
NAT E. ARAUJO

BASKET FOR BABY BOTTLE

This invention relates to baskets; more particularly, to a basket adapted to hold a baby bottle in a more or less horizontal position so that the baby can suck the milk out of the bottle through a nipple that is on the mouth of the baby bottle. All baskets are not necessarily made of interwoven cane. The Webster Dictionary defines a basket as "anything used or shaped like a basket."

It is the principle object of this invention to provide a basket for a baby bottle that is made of one piece of material being made in such a way as to firmly hold a baby bottle in a nearly horizontally disposed position at all times.

Another object of this invention is to provide a basket for a baby bottle that is unbreakable and is easy to clean with a minimum amount of effort and in a minimum of time.

Still another object of this invention is to provide a baby bottle basket holder that can be manufactured and retailed at a price within the reach of everyone desiring a basket that will hold a baby bottle in the most efficient position for feeding a baby in a crib or the like.

With the foregoing and other equally important objects in view, the invention resides in certain new and useful construction and arrangement of parts of the basket as will hereinafter more fully be described and set forth in the appended claims and illustrated in the accompanying drawing, in which:

In the several views of the drawing, like parts of this invention are indicated by the same reference number.

The reference number 7 indicates this invention in its entirety.

Figure 1:
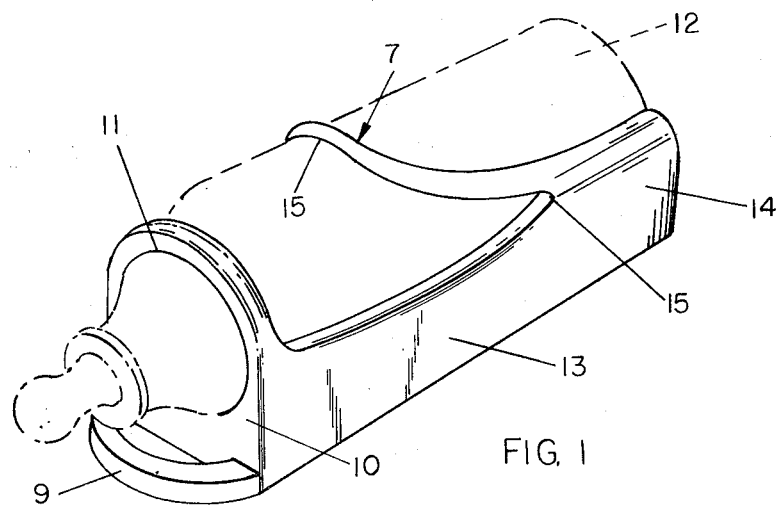
FIG. 1 is a pictorial view of this invention in actual use.
Figure 2:
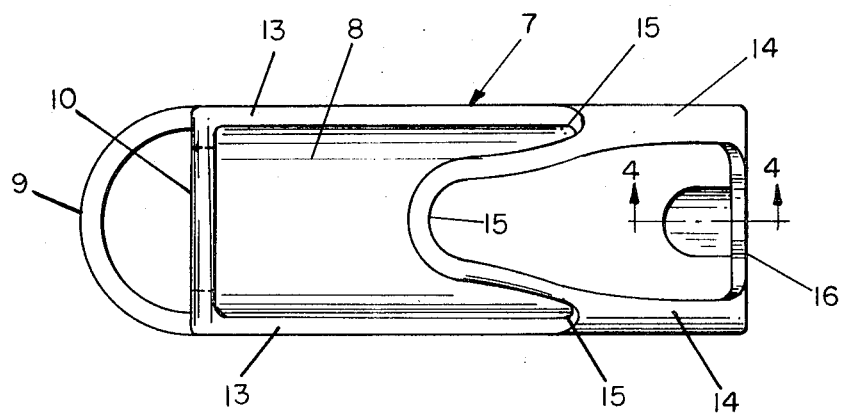
FIG. 2 is a top view of this invention.
Figure 3:
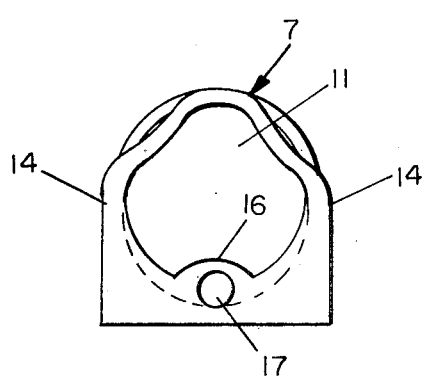
FIG. 3 is a rear view of this invention.
Figure 4:
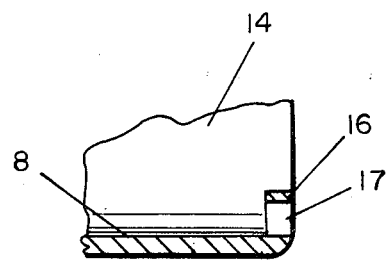
FIG. 4 is a sectional view of a portion of this invention, taken substantially along line 4—4 of FIG. 2, and viewed in the direction indicated by the arrows.

Looking first at FIGS. 1 and 2 of the accompanying drawing it will be seen that this invention 7 consists of a rectangular flat bottom 8 having a rounded outwardly projecting front end strap 9. A vertically disposed front 10 is provided with a large round opening 11 through which is placed the neck of a baby bottle 12. Two vertically disposed sides 13 extend upward for a distance that is approximately half the diameter of a baby bottle, the sides extending backward from the aforesaid front 10 for a distance of approximately seven-eighths the length of the baby bottle where the sides extend upward to a distance that is approximately two-thirds of the baby bottle diameter. This last-mentioned portion of the aforesaid sides 13 is indicated in FIGS. 1 and 2 of the accompanying drawing by the reference number 14.

Continuing to look at FIGS. 1 and 2 of the drawing it will be seen that the bottle holder 15 is in the form of a strap. The strap has its two ends integrally formed with the intersection of the rear portion of the aforesaid sides 13 and the front portion of that part of this invention that is indicated by the already mentioned reference number 14. This actual intersection of the aforesaid bottle holder, which is U-shaped when viewed from the top, and the sides is indicated in the drawing by the reference number 15. The upper edge of each rear side portion 14 is curved around the rear side portion of the aforesaid baby bottle 12.

A vertically disposed rounded lip 16 that is located at the rear end of the aforesaid basket 7 is provided with a horizontally disposed opening 17 through which one can place ones finger in order to help in the removal of the aforesaid baby bottle 11 from this novel basket.

From the foregoing it is herein seen that I have now provided a basket for a baby bottle that fulfills all of the objects of this invention. The invention is subject to any and all changes and/or modifications that one may care to make in so long as the changes and/or modifications fall within the scope and intent of the appended claims.

What I now claim as new and desire to secure by Letters Patent is:

1. A basket for a baby bottle comprising a single piece of rubber or the like having a vertically disposed front and a horizontally disposed flat bottom which is rectangular when viewed from the top and is provided with a rounded front end strap forward of the vertically disposed front; the said basket having vertically disposed sides that extend upward for a distance that is approximately half the diameter of the said baby bottle in the front portion of the said basket and the said sides extend upward for a distance that is approximately two-thirds the diameter of the said baby bottle in the rear portion of the said basket, the rear portion of the said sides curving around the said baby bottle.

2. The invention of claim 1, wherein the said basket is provided with a bottle holder that is U-shaped when viewed from the top, the said bottle holder being in the form of a strap that has its ends integrally formed with the intersection of the sides of the said basket at that point on the sides where the sides change in height.

3. The invention of claim 2, wherein the rear end of the said basket is provided with a vertically disposed rounded lip having a horizontally disposed opening therein to enable one to place a finger therein and thus assist in the removal of a baby bottle from the said basket.

* * * * *